(12) United States Patent
Hole et al.

(10) Patent No.: US 8,934,899 B2
(45) Date of Patent: Jan. 13, 2015

(54) APPARATUS AND METHOD FOR HIGH PRIORITY SEARCH ON RRC STATE CHANGE

(75) Inventors: David P. Hole, Southampton (GB); Andrew J. Farnsworth, Birmingham (GB); Tomasz H. Mach, Slough (GB); Takashi Suzuki, Tokyo (JP); Giri N. Reddy, Birmingham (GB)

(73) Assignee: BlackBerry Limited, Waterloo, Ontario (CA)

( * ) Notice: Subject to any disclaimer, the term of this patent is extended or adjusted under 35 U.S.C. 154(b) by 295 days.

(21) Appl. No.: 13/468,854

(22) Filed: May 10, 2012

(65) Prior Publication Data

US 2013/0303174 A1 Nov. 14, 2013

(51) Int. Cl.
*H04W 4/00* (2009.01)
*H04W 36/00* (2009.01)
*H04M 1/00* (2006.01)
*H04W 24/00* (2009.01)

(52) U.S. Cl.
USPC ....... 455/435.2; 455/73; 455/424; 455/435.1; 455/435.3; 455/436; 455/437; 370/329; 370/331

(58) Field of Classification Search
CPC ..... H04W 36/08; H04W 36/04; H04W 36/14; H04W 36/30; H04W 36/32
USPC .......... 455/435, 436, 437, 552, 435.1, 552.1, 455/435.2, 435.3, 73, 424; 370/329, 331
See application file for complete search history.

(56) References Cited

U.S. PATENT DOCUMENTS

| | | | |
|---|---|---|---|
| 2007/0099652 A1* | 5/2007 | Lindoff et al. | 455/552.1 |
| 2008/0057948 A1 | 3/2008 | Mittal et al. | |
| 2008/0220784 A1* | 9/2008 | Somasundaram et al. | 455/437 |
| 2010/0240368 A1* | 9/2010 | Fox et al. | 455/435.3 |
| 2010/0285830 A1* | 11/2010 | Englund et al. | 455/522 |
| 2012/0252455 A1* | 10/2012 | Martin et al. | 455/436 |

OTHER PUBLICATIONS

Written Opinion and International Search Report dated Oct. 8, 2013 in International Application No. PCT/IB2013/001426.

* cited by examiner

*Primary Examiner* — Inder Mehra

(57) ABSTRACT

A user equipment is provided comprising: 1) transceiver circuitry configured to operate in cells associated with at least one radio access technology (RAT) network; and 2) a controller configured to perform neighbor cell searches. The controller is further configured to determine when the user equipment enters a first RRC state from a second RRC state. In response to the determination, the controller determines a time period since a most recent search of neighbor cells was performed. The first RRC state is one of at least: CELL_PCH, URA_PCH and IDLE. The second RRC state is one of at least CELL_FACH and CELL_DCH.

18 Claims, 4 Drawing Sheets

APPARATUS AND METHOD FOR HIGH PRIORITY SEARCH ON RRC STATE CHANGE

CROSS-REFERENCE TO RELATED APPLICATION(S)

The present application is related to U.S. patent application Ser. No. 13/466,979, filed on May 8, 2012, and entitled "Apparatus And Method For Storage of Priority-Based Reselection Parameters At Handover And Connection Establishment" and to U.S. patent application Ser. No. 13/466,993, filed on May 8, 2012, and entitled "Apparatus And Method For Processing Priority Information In A Wireless Device". Patent application Ser. Nos. 13/466,979 and 13/466,993 are assigned to the assignee of the present application and are hereby incorporated by reference into the present application as if fully set forth herein.

TECHNICAL FIELD

The present application relates generally to wireless devices and, more specifically, to performing neighbouring cell searches on state changes.

BACKGROUND

Conventional wireless networks support priority-based reselection (PBR) operations, in which a user equipment (or mobile device) accessing a first cell re-selects to a second cell. A priority-based reselection operation uses priority information in its algorithm to choose the second cell. The priority information may be common priority information that is common to multiple user equipment or may be dedicated priority information that is device-specific to a particular user equipment.

In a priority-based reselection algorithm, an initial ranking of neighboring cells may be done based on assigned priorities rather than on relative or absolute radio measurement. It is possible to assign device-specific priority information, which persists across multiple cells, including cells of different radio access technologies (RATs). Reselection algorithms are typically based on measured properties of a signal associated with a particular cell. For example, for a GSM cell, measurements of the signal transmitted on the broadcast control channel (BCCH) frequency for that cell may be used for a PBR algorithm.

In earlier reselection algorithms, a wireless device often made such measurements for multiple (possibly all) candidate cells. This often required measurements and comparisons of values for cells using different radio access technologies. As the numbers and types of cells increase (e.g., introduction of new radio access technologies), such a reselection algorithm becomes progressively more complex. First, there are more candidate neighbor cells to evaluate. Also, it becomes harder to define appropriate ways of comparing measurements of cells that operate using different radio access technologies.

Additionally, the mobility of user mobile devices increases the number of reselection and handover operations and increases the number and frequency of cell searches accordingly. Previous changes in Release 10 (Rel-10) of 3GPP mandate a high priority search within a short time period of entering CELL_PCH state, URA_PCH state, or IDLE state. While this potentially speeds up a reselection to a higher priority layer by avoiding the possibility that the user equipment waits so long to perform the search that it enters a non-idle state first, it also imposes unreasonable searching requirements on user equipment that enter and leave these states frequently.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
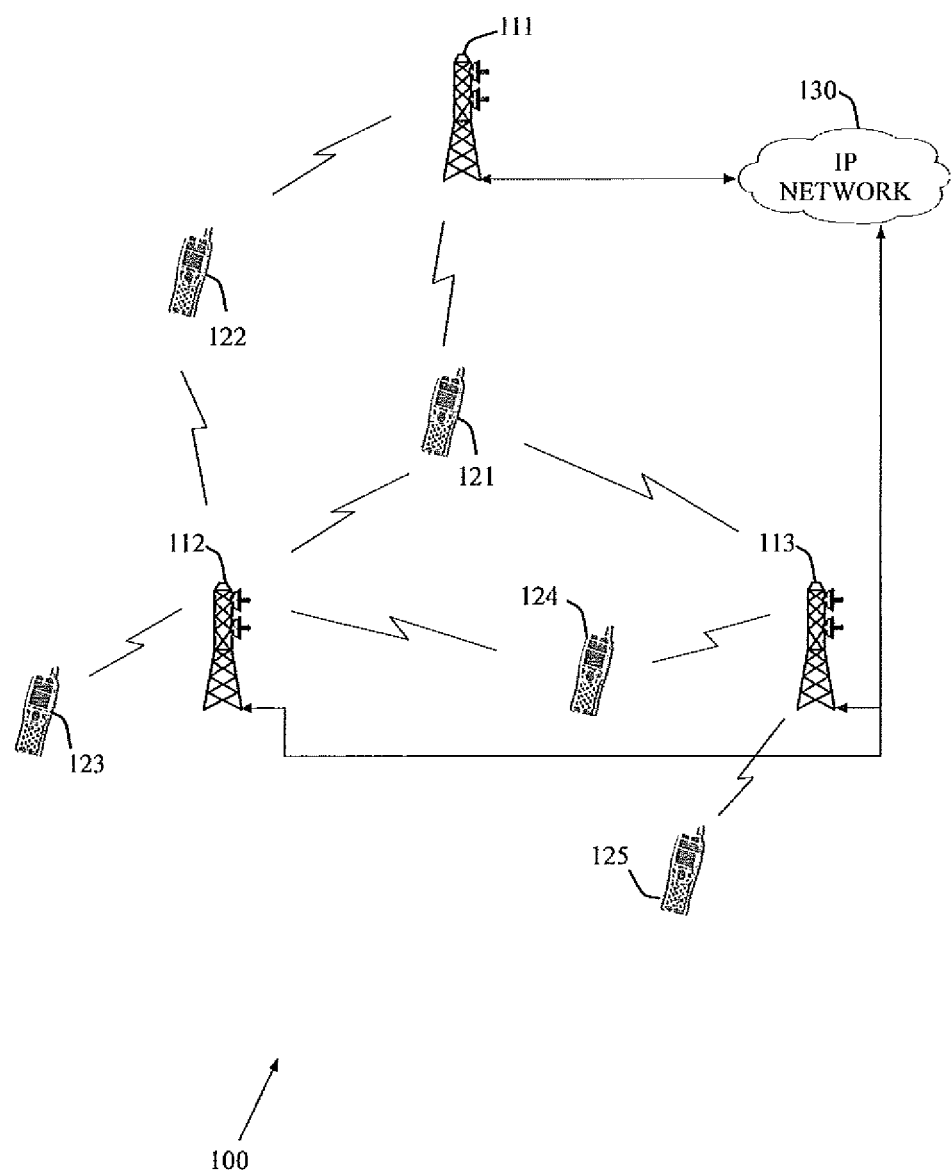
FIG. 1 illustrates an exemplary wireless network according to one implementation of the disclosure.

FIGS. 1 through 4, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless user equipment.

In 3GPP Release 8, which coincided with the first specifications of the Evolved UMTS Terrestrial Radio Access Network (E-UTRAN), a new priority-based reselection (PBR) algorithm was defined based on priority levels. In a PBR algorithm, cells are grouped into different priority layers. For any given neighbour cell, a determination is made as to whether it fulfills certain reselection requirements. If it meets the requirements, then no further evaluation of cells with lower priorities is necessary. Comparison of multiple cells is only necessary if multiple cells within a priority level meet the criteria. In the 3GPP priority-based reselection algorithm, it is not permitted to have cells using different radio access technologies (RATs have the same priority level. This means there is no requirement to compare measurements of cells of different RATs when using the reselection algorithm. Examples of different (RATs) are Global System for Mobile Communications (GSM), UTRAN and E-UTRAN.

Two sets of thresholds for candidate neighbour cells are specified. The set of thresholds to be used depends on whether the neighbour cell has a higher or lower priority than the serving cell. For candidate neighbour cells with a higher priority than the serving cell, the reselection criteria do not include any criteria associated with the serving cell. Reselection to a candidate neighbour cell with a lower priority than the serving cell is possible only if the serving cell measurements meet some criteria—typically that the strength and/or quality of the serving cell signal has dropped below some threshold(s).

Searching for Neighbor Cells

In UTRAN, there is an existing requirement in Section 4.2.2.3 (Measurement of Inter-Frequency FDD Cells) of 3GPP Technical Specification 25.133 to search for cells and, if found, to measure the cells. Priority information for UTRA FDD carrier frequencies may be provided in the measurement control system information. Then, if $Srxlev_{ServingCell} > S_{prioritysearch1}$, and
$Squal_{ServingCell} > S_{prioritysearch2}$,
then the user equipment (UE) in Idle, Cell_PCH or URA_PCH shall search for any higher priority UTRA inter-frequency cells at least every time period $T_{higher\_priority\_search}$. An example of the parameter $T_{higher\_priority\_search}$ is described in section 4.2.2 of 3GPP TS 25.133.

If the user equipment (UE) is not in CELL_PCH state, URA_PCH state, or IDLE state, then the UE shall search for UTRA FDD layers of higher priority within time period ($T_{higher\_layer\_start}$) upon entering into any of these states. If less than one (1) second has elapsed since the UE camped on the current serving cell when the UE enters into any one of these states, then the value of parameter $T_{higher\_layer\_start}$ is one DRX cycle, plus 1 second. Otherwise, the value of $T_{higher\_layer\_start}$ is one DRX cycle. If higher priority UTRA cells are found by the higher priority search, the higher priority UTRA cell may be measured at least every $(N_{carrier}-1)*T_{measureFDD}$ seconds.

If, after detecting a cell in a higher priority search, it is determined that reselection has not occurred, then the user equipment (UE) is not required to continuously measure the detected cell to evaluate the ongoing possibility of reselection. However, the specified minimum measurement filtering requirements may still be met by the UE before the UE makes any determination to stop measuring the cell.

The relevant text of the first change request related to the above modifications to change to 3GPP TS 25.133 stated the reasons for the change:

"Cell reselection requirements for higher priority layer search when UE changes from active states to idle, URA_PCH or CELL_PCH are unclear regarding the time instant when higher priority search is to be triggered. In case of frequent state transitions between active and semi-idle states caused by some application's traffic pattern this can lead to a situation in which a higher priority layer is not selected or rarely selected for cell reselection." RP-110778, RAN#52, "Cell Reselection Requirements for Higher Priority Layer", SOURCE: Nokia Siemens Networks, Nokia, Renesas Mobile Europe Ltd, TeliaSonera, MediaTek)

Mobility States

In UTRAN and E-UTRAN, the user equipment (UE) may be associated with a mobility state. For example, in UTRAN, the UE may be in a high-mobility state if ordered by the network or if the number of cell reselections in the recent past exceeds a threshold. For example, in 3GPP TS 25.304 Section 5.2.5.1.1A (High-Mobility State When HCS Is Not Used), the high-mobility state is applicable in the non-hierarchical cell structure (non-HCS) case, if the parameters non-HCS_$T_{CRmax}$, non-HCS_$N_{CR}$, and non-HCS_$T_{CRmaxhyst}$ are broadcast in system information. If, in non-HCS environment, the number of cell reselections during time period non-HCS_$T_{CRmax}$ exceeds non-HCS_$N_{CR}$, or if the network via RRC signaling has ordered the UE to consider itself to be in high-mobility state, then the high-mobility state has been detected. When the number of cell reselections during time period non-HCS_$T_{CRmax}$ no longer exceeds non-HCS_$N_{CR}$, the UE continues in high-mobility state. If the criteria for entering high-mobility state are not detected during time period non-HCS-$T_{CrmaxHyst}$, then the UE exits high-mobility state. If the UE is in non-HCS environment and in high-mobility state, the UE shall apply the speed dependent scaling rules as defined in Section 5.2.6.1.4 of 3GPP TS 25.304.

However, according to conventional search requirements, if a device goes from connected to idle frequently (e.g., more frequently than once every 60*Nlayers seconds), the device will perform high priority measurements more frequently than a device that is idle over the same period. If there are a high number of higher priority layers (or a given layer includes a high number of discrete frequencies), this may introduce significant excessive battery consumption.

Thus, while the 3GPP standard may address the potential problem that a device switching between states may never (or very rarely) perform higher priority layer searches, it also may introduce excessive measurement requirements. Also, the UE may not have received the complete system information for the serving cell (e.g., SIB 11, 11bis, 19), which contain neighbor cell information and priority information. As a result, the existing requirement may mean that the UE performs a high-priority search without knowing: a) which high-priority frequencies are in the local area; and/or b) if it is using common priorities signaled in system information, which frequencies are high priority.

The present disclosure describes improved apparatuses and methods that enable user equipment to do a high priority search less frequently while ensuring reselection to higher priority layers within a reasonable delay. Thus, existing 3GPP specifications may be modified so that a search is only required if the most recent search was carried out more than $T_{higher\_priority\_search}$ seconds ago. In such an implementation, the parameter $T_{HPF2\_SEARCH}$ is considered to be equal to $T_{higher\_priority\_search}$. The previous search may have been performed: 1) for the same purpose (i.e., higher priority cell search), 2) for a broader purpose (e.g., cell search for higher or lower priority cells), or 3) during any RRC state. Another condition may be that the UE has not changed serving cell since the previous search.

In one implementation, the parameter $T_{HPF2\_SEARCH}$ may be, for example, 60*$N_{layers}$ seconds. Other implementations may have different values. Advantageous values may be, for example, in the range $1 << T_{HPF2\_SEARCH} \leq 60*N_{layers}$ seconds. As a further enhancement, the parameter $T_{HPF2\_SEARCH}$ may be dependent on mobility (e.g., on the mobility state of the UE). For a higher mobility UE, the value of $T_{HPF2\_SEARCH}$ would be set lower. This minimizes the risk that the UE has moved too far since the previous search and that the previous search results are invalid.

In another implementation $T_{HPF2\_SEARCH}$ for a given layer depends on how recently any cell on that layer has been detected. If one or more cells on a layer have been detected recently (e.g. within a most recent period of 3 minutes), then $T_{HPF2\_SEARCH}$ for that layer is reduced (relative to $T_{HPF2\_SEARCH}$ for other layers, or relative to $T_{HPF2\_SEARCH}$ for that layer when no cells have been detected on that layer recently).

The foregoing improvements may be described (in respect of a UE camped on a UTRAN cell) by modifying 3GPP 25.133 in Section 4.2.2.3 (Measurement of Inter-frequency FDD Cells) as follows (additions are underlined):

If priority information for UTRA FDD carrier frequencies is provided in the measurement control system information and $Srxlev_{ServingCell} > S_{prioritysearch1}$ and $Squal_{ServingCell} > S_{prioritysearch2}$ then the UE shall search for any higher priority UTRA inter-frequency cells at least every $T_{higher\_priority\_search}$ where $T_{higher\_priority\_search}$ is described in section 4.2.2. If the UE is not in CELL_PCH, URA_PCH or IDLE state then the UE shall search for UTRA FDD layers of higher priority within $T_{higher\_layer\_start}$ upon entering into any of these states unless its most recent search for UTRA FDD layers of higher priority was within the last $T_{higher\_priority\_search}$ seconds. If 1 second has not elapsed since the UE camped on the current serving cell when the UE enters into any of these states, $T_{higher\_layer\_start}$ is one DRX cycle plus 1 second; otherwise . . . .

Additionally, 3GPP 25.133 may be modified in Section 4.2.2.5.2 (Cell Reselection Based On Priority Information) as follows (additions are underlined):

If $Srxlev_{ServingCell}>S_{prioritysearch1}$ and $Squal_{ServingCell}>S_{prioritysearch2}$ then the UE shall search for GSM BCCH carrier at least every $T_{higher\_priority\_search}$ where $T_{higher\_priority\_search}$ is described in section 4.2.2. If the UE is not in CELL_PCH, URA_PCH or IDLE state then the UE shall search for GSM layers of higher priority within $T_{higher\_layer\_start}$ upon entering into any of these states unless its most recent search for GSM layers of higher priority was within the last $T_{higher\_priority\_search}$ seconds. If 1 second has not elapsed since the UE camped on the current serving cell when the UE enters into any of these states, $T_{higher\_layer\_start}$ is one DRX cycle plus 1 second; otherwise . . . .

Finally, 3GPP 25.133 may be modified in Section 4.2.2.5.a (Measurement of Inter-RAT E-UTRA Cells) as follows (additions are underlined):

If $Srxlev_{ServingCell}>S_{prioritysearch1}$ and $Squal_{ServingCell}>S_{prioritysearch2}$ then the UE shall search for E-UTRA layers of higher priority at least every $T_{higher\_priority\_search}$ where $T_{higher\_priority\_search}$ is described in section 4.2.2. If the UE is not in CELL_PCH, URA_PCH or IDLE state then the UE shall search for E-UTRA layers of higher priority within $T_{higher\_layer\_start}$ upon entering into any of these states unless its most recent search for E-UTRA layers of higher priority was within the last $T_{higher\_priority\_search}$ seconds. If 1 second has not elapsed since the UE camped on the current serving cell when the UE enters into any of these states, $T_{higher\_layer\_start}$ is one DRX cycle plus 1 second; otherwise $T_{higher\_layer\_start}$ is one DRX cycle. The minimum rate at which the UE is required to search for and measure such layers may be reduced in this scenario to maintain UE battery life.

It is noted that the proposed changes herein are presented in the context of a UTRAN system. However, it will be understood by those of ordinary skill in the art that the apparatuses and methods described herein may readily apply to other RATs, such as GSM and E-UTRAN.

FIG. 1 illustrates an exemplary wireless network 100 according to one implementation of the present disclosure. Wireless network 100 includes base station (BS) 111, BS 112, and BS 113. BS 111, BS 112 and BS 113 may communicate with each other via wireless links or by a wireline backbone network (e.g., optical fiber, DSL, cable, T1/E1 line, etc.). By way of example, in FIG. 1, each of base stations 111-113 is configured to communicate with other base stations using Internet protocol (IP) network 130, which may be, for example, the Internet, a proprietary IP network, or another data network. Each of base stations 111-113 is also configured to communicate with a conventional circuit-switched telephone network (not shown), either directly or by means of network 130.

BS 111 provides wireless broadband access to network 130 to a first plurality of user equipments (UEs) within a coverage area of BS 111. The first plurality of UEs includes user equipment (UE) 121 and UE 122, among others. BS 112 provides wireless broadband access to network 130 to a second plurality of UEs within a coverage area of BS 112. The second plurality of UEs includes UE 121, UE 122, UE 123, and UE 124, among others. BS 113 provides wireless broadband access to network 130 to a third plurality of UEs within a coverage area of BS 113. The third plurality of UEs includes UE 121, UE 124, and UE 125, among others. It is noted that UE 121 is able to access all three of base stations 111-113, whereas UE 125 is only able to access BS 113 and UE 123 is only able to access BS 112. UE 122 and UE 124 can each access two base stations.

Each of base stations 111-113 may provide different levels of service to UEs 121-125 according to priority levels (common and/or dedicated) associated with each UE. For example, BS 111 may provide a T1 level service to UE 121 and may provide a fractional T1 level service to UE 122. UEs 121-125 may use the broadband access to network 130 to access voice, data, video, video teleconferencing, and/or other broadband services. Each one of UEs 121-125 may be any of a number of types of wireless devices, including a wireless-enabled laptop computer, a personal data assistant, a notebook, a mobile phone, a tablet, or another wireless-enabled device.

It is noted that the term "base station" may be commonly used in some types of networks, such as CDMA2000 systems or some 3GPP systems. But "base station" is not universally used in all types of radio access technology (RAT). In some types of networks, the term "base station" may be replaced by "eNodeB", or "eNB", or "access point". For the purposes of simplicity and consistency, the term "base station" is used in this disclosure document, and in the claims in particular, to refer to the network infrastructure device that provides wireless access to user equipment.

Similarly, the term "user equipment" may be commonly used in some types of networks, but not in others. In some types of networks, the term "user equipment" may be replaced by "subscriber station", "mobile station", "remote terminal", "wireless terminal" or the like. For the purposes of simplicity and consistency, the term "user equipment", or "UE", is used in this disclosure document, and in the claims in particular, to refer to the remote wireless device that accesses the network infrastructure device (i.e., the base station).

Figure 2:
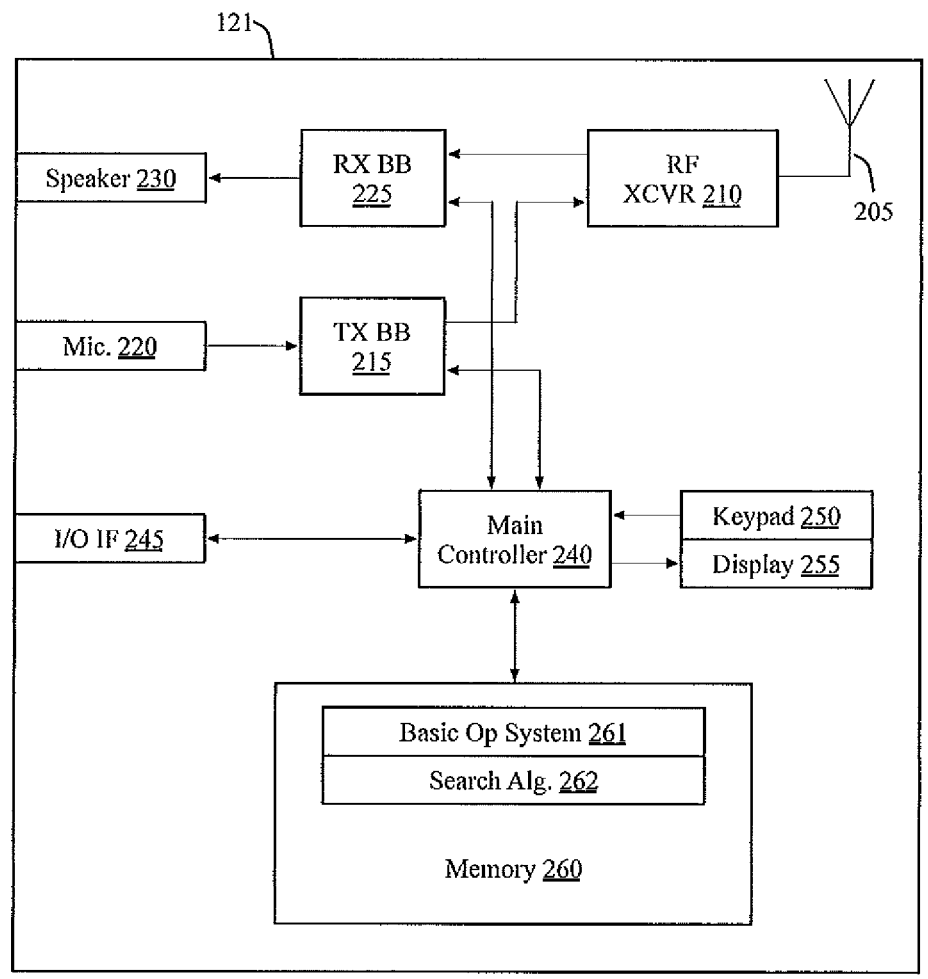
FIG. 2 illustrates user equipment according to one implementation of the disclosure.

FIG. 2 illustrates an exemplary user equipment (UE) 121 that performs high priority cell searches according to the present disclosure. UE 121 comprises at least one antenna 205, radio frequency (RF) transceiver (XCVR) 210, transmitter baseband (TX BB) processing circuitry 215, microphone 220, and receiver baseband (RX BB) processing circuitry 225. UE 121 also comprises speaker 230, main controller 240, input/output (I/O) interface (IF) 245, keypad 250, display 255, and memory 260. Memory 260 stores basic operating system (OS) program 261, search algorithm 262, and other data (not shown).

Radio frequency transceiver 210 receives from antenna 205 an incoming RF signal transmitted by a base station of wireless network 100. Radio frequency transceiver 210 comprises receiver circuitry configured to operate in cells associated with one or more types of radio access technology (RAT) networks (e.g., GSM, UTRAN, E-UTRAN, etc.). Radio frequency transceiver 210 down-converts the incoming RF signal to produce an intermediate frequency (IF) or a baseband signal. The IF or baseband signal is sent to RX BB processing circuitry 225, which may produce a processed baseband signal by, for example, filtering and digitizing the received baseband or IF signal, additional filtering, and, if necessary, demodulation and/or decoding. Receiver baseband (RX BB) processing circuitry 225 transmits the processed baseband signal to speaker 230 (i.e., voice data) or to main controller 240 for further processing (e.g., web browsing).

Transmitter baseband (TX BB) processing circuitry 215 may receive analog or digital voice data from microphone 220 or other outgoing baseband data (e.g., web data, e-mail, interactive video game data) from main controller 240. TX BB processing circuitry 215 may encode, modulate, multiplex, and/or digitize the outgoing baseband data to produce a processed baseband or IF signal. Radio frequency transceiver 210 receives the outgoing processed baseband or IF signal from TX BB processing circuitry 215. Radio frequency transceiver 210 up-converts the baseband or IF signal to a radio frequency (RF) signal that is transmitted via antenna 205.

Main controller 240 may comprise any device, system or part thereof that controls at least one operation. Such a device may be implemented in hardware, firmware or software, or some combination of at least two of the same. Main controller 240 is a microprocessor or a microcontroller. Memory 260 is coupled to main controller 240. Part of memory 260 may comprise a random access memory (RAM) and another part of memory 260 may comprise a non-volatile memory, such as Flash memory.

Main controller 240 executes basic operating system (OS) program 261 stored in memory 260 in order to control the overall operation of UE 121. In one such operation, main controller 240 controls the reception of forward channel signals and the transmission of reverse channel signals by radio frequency transceiver 210, RX BB processing circuitry 225, and TX BB processing circuitry 215, in accordance with well-known principles.

Main controller 240 is capable of executing other processes and programs resident in memory 260. Main controller 240 can move data into or out of memory 260, as required by an executing process. Main controller 240 is also coupled to I/O interface 245. I/O interface 245 provides UE 121 with the ability to connect to other devices, such as laptop computers and handheld computers. I/O interface 245 is the communication path between these accessories and main controller 240. Main controller 240 may also be coupled to an input device, such as keypad 250, and display 255. The operator of UE 121 uses keypad 250 to enter data into UE 121. Display 255 may be a liquid crystal display capable of rendering text and/or at least limited graphics from web sites. Alternate examples may use other types of displays (or none). Display 255 may include a touch screen input device that may be used in conjunction with, or in place of keypad 250.

UE 121 is configured to perform a high priority search in memory 260 according to the principles of the present disclosure. Main controller 240 executes search algorithm 262 and uses internal timers (not shown) to perform high priority searches.

Figure 3:
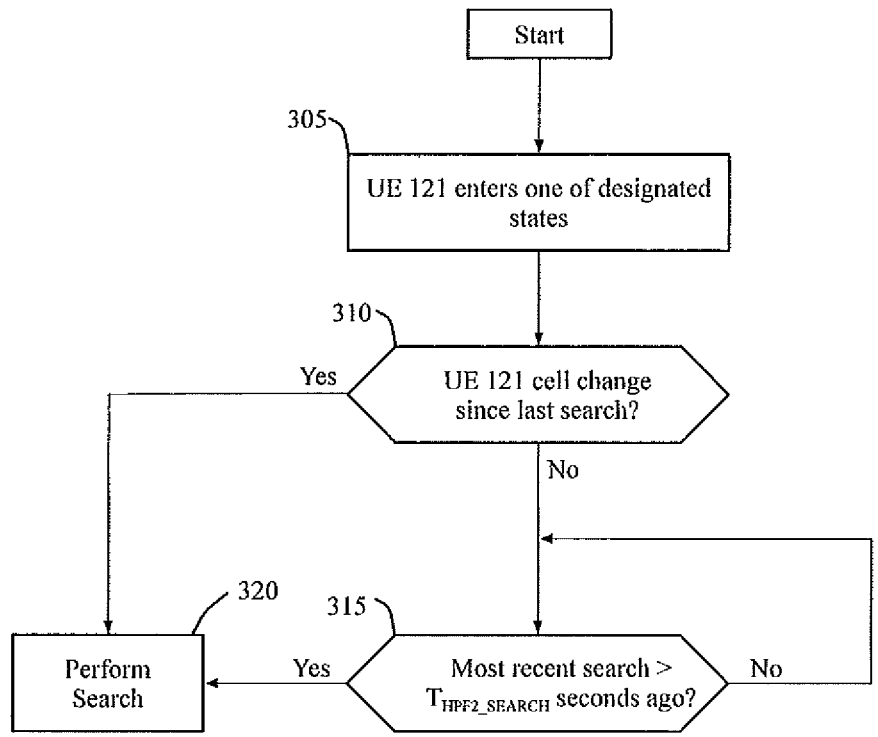
FIG. 3 illustrates the operation of exemplary user equipment that performs cell search according to one implementation of the disclosure.

FIG. 3 illustrates the operation of exemplary user equipment 121, which performs cell searches according to one implementation of the disclosure. Initially, it is assumed that UE 121 is not in one of the designated RRC states (i.e., CELL_PCH state, URA_PCH state, or IDLE state). At some point, main controller 240 determines that UE 122 has entered one of the designated states (step 305).

Next, main controller 310 determines whether or not UE 121 has changed cells since the last high-priority search was performed (step 310). If UE 121 has changed cells since the last high-priority search (Yes in 310), then main controller 240 performs another high priority search (step 320). If UE 121 has not changed cells since the last high-priority search (No in 310), then main controller 240 determines whether or not the most recent high-priority search occurred more than the threshold value of parameter $T_{HPF2\_SEARCH}$ seconds ago (step 315). If the last search occurred more than the threshold value ago (Yes in 315), then UE 121 performs a high priority search (step 320). If the last search occurred less than the threshold value ago (No in 315), then UE 121, after a suitable time delay, will subsequently re-determine whether or not the most recent high-priority search occurred more than the threshold value of parameter $T_{HPF2\_SEARCH}$ seconds ago (loop back to step 315).

Alternative Solution

It is noted that the high priority search algorithm described above may occur during CELL_PCH state, URA_PCH state, or IDLE state. However, in other cases, the most recent search may have occurred in a connected mode state. It is possible to take advantage of the fact that the UE, when moving to connected mode (e.g., CELL_FACH, CELL_DCH) due to data activity for even a short period of time, may perform a search of the higher priority cells while in the connected mode. This may require one of the following to be available: 1) measurement gaps available for inter-frequency or inter-RAT neighbour cell measurements during the connected mode, or 2) more than one RF receiver available for parallel inter-frequency or inter-RAT neighbor cell measurements.

Assuming that the UE does not change cell while in CELL_FACH or CELL_DCH, the UE may still have valid higher priority search information that could be reused upon entering IDLE, CELL_PCH or URA_PCH states. In particular while being in CELL_FACH or CELL_DCH state, UE 121 may detect if any higher priority cells are available and may store this information in memory 260 before or when leaving the connected state. For efficiency reasons, it is assumed that a preferred implementation would reuse the latest high priority measurements performed in connected state. In case of detecting a high priority cell and no cell change in connected state, UE 121 may continue to measure and evaluate this higher priority cell for priority-based reselection as required by Section 4.2.2.3 of 3GPP 25.133.

An advantage of this implementation is that UE 121 may effectively reuse the high priority search result performed in connected state while not being in connected state. As a result, UE 121 may skip performing an additional high priority search operation upon entering IDLE, CELL_PCH or URA_PCH state, thereby resulting in battery savings. It is noted that the purpose of the measurements in connected mode may or may not be specifically for the purpose of identifying higher priority cells. The measurements may have been, for example, as a pre-requisite to performing reporting of measured neighbour cells.

Figure 4:
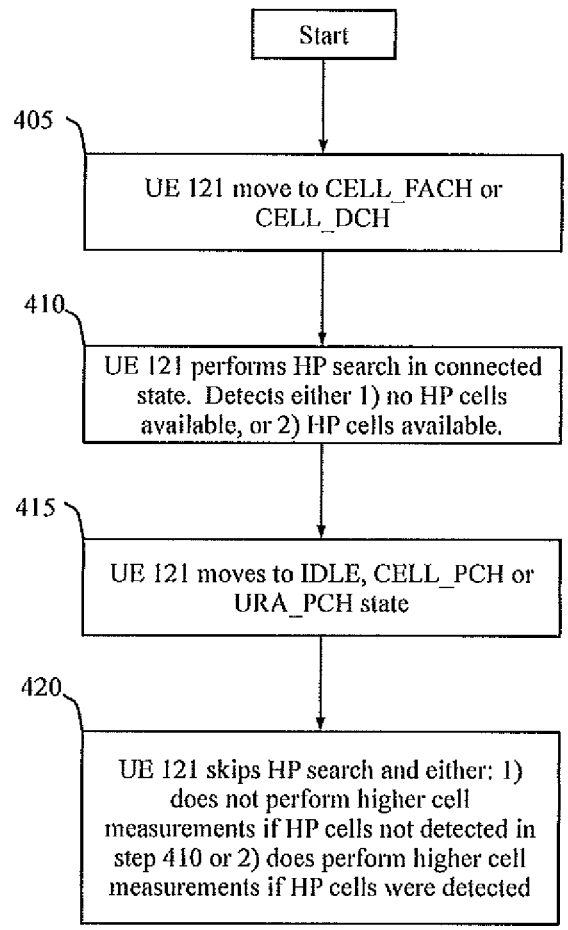
FIG. 4 illustrates the operation of exemplary user equipment, which performs cell searches according to an alternative implementation.

FIG. 4 illustrates the operation of exemplary user equipment 121, which performs cell searches according to an alternative implementation. Initially, UE 121 moves to CELL_FACH or CELL_DCH (step 405). Next, UE 121 performs a higher priority search in the connected state. UE 121 detects either: 1) no higher priority cells available, or 2) high priority cells available (step 410). Thereafter, UE 121 moves to IDLE, CELL_PCH or URA_PCH state when data activity is finished (step 415). Finally, UE 121 skips a high priority search when entering non-connected state and depending on the results of detection in the second step, preferably further taking into account the elapsed time since the detection in the second step: 1) UE 121 does not perform any higher cell measurements if no higher priority cells detected in connected state; and 2) UE 121 does perform higher cell measurements and priority based cell reselection evaluation if higher priority cells were detected in connected state (step 420). If the elapsed time since the detection in the second step exceeds a limit, then the UE 121 performs higher cell measurements and priority based cell reselection evaluation regardless of the outcome of the detection.

The above-disclosed implementations are by way of example only. The scope of the present disclosure and the claims below are not limited to the exemplary implementations. In particular, the exemplary search algorithms are not limited to priority-based reselection (PBR) searches. In alternate implementations, other types of search algorithms may be used. Additionally, the present disclosure and claims are not limited to a UTRAN network. Those skilled in the art will appreciate that the apparatuses and methods disclosed herein may be readily adapted for use in other types of RAT networks. Furthermore, the present disclosure and claims are not limited to searches for higher-priority cells. In alternate implementations, the apparatuses and methods disclosed herein may be readily adapted for use in searches for other classifications of potential neighbour cells.

In the exemplary implementations described above, the algorithm may be implemented in respect of all higher priority layers jointly, on a per-RAT basis, or on a per-carrier frequency basis. For example, in respect of the algorithm illustrated in FIG. 4, if one higher priority E-UTRAN carrier frequency, f1, has been searched recently in CELL_FACH or Cell_DCH, and another higher priority E-UTRAN carrier frequency, f2, has not been searched, then on entry to IDLE, or Cell_PCH, or URA_PCH, the UE may omit or refrain from searching on carrier frequency f1, and search only on carrier frequency f2.

SIB reading—In one implementation, UE 121 delays the high priority search (which would otherwise be required within $T_{higher\_layer\_start}$ seconds, as defined in the existing specification, until UE 121 has received all necessary system information for the serving cell.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment comprising:
 transceiver circuitry configured to operate in cells associated with at least one radio access technology (RAT) network; and
 a controller configured to perform neighbour cell searches, wherein the controller is further configured to determine when the user equipment enters a first RRC state from a second RRC state and, in response to the determination, to determine whether the time period since a most recent search is greater than a threshold value.

2. The user equipment as set forth in claim 1, wherein the most recent search was a search for higher priority cells operating on a first carrier frequency.

3. The user equipment as set forth in claim 1, wherein the first RRC state is one of at least: CELL_PCH, URA_PCH and IDLE.

4. The user equipment as set forth in claim 1, wherein the second RRC state is one of at least CELL_FACH and CELL_DCH.

5. The user equipment as set forth in claim 1, wherein the controller, in response to a determination that the time period since the most recent search is greater than the threshold value, is further configured to perform a new search.

6. The user equipment as set forth in claim 1, wherein the controller is further configured to determine whether the user equipment has changed cells since the most recent search was performed.

7. The user equipment as set forth in claim 6, wherein the controller, in response to a determination that the user equipment has not changed cells since the most recent search was performed, is further configured to determine whether the time period since the most recent search is greater than a threshold value.

8. The user equipment as set forth in claim 7, wherein the controller, in response to a determination that the time period since the most recent search is greater than the threshold value, is further configured to perform a new search.

9. The user equipment as set forth in claim 8, wherein the most recent search searched for higher priority cells operating on a first carrier frequency.

10. A method of operating a user equipment configured to operate in cells associated with at least one radio access technology (RAT) network, the method comprising:
 performing a search for neighbour cells;
 determining when the user equipment enters a first RRC state from a second RRC state; and
 in response to the determination, determining whether a time period since a most recent search is greater than a threshold value.

11. The method as set forth in claim 10, wherein the most recent search was a search for higher priority cells operating on a first carrier frequency.

12. The method as set forth in claim 10, wherein the first RRC state is one of at least: CELL_PCH, URA_PCH and IDLE.

13. The method as set forth in claim 10, wherein the second RRC state is one of at least CELL_FACH and CELL_DCH.

14. The method as set forth in claim 10, further comprising, in response to a determination that the time period since the most recent search is greater than the threshold value, performing a new search.

15. The method as set forth in claim 10, further comprising determining whether the user equipment has changed cells since the most recent search was performed.

16. The method as set forth in claim 15, further comprising, in response to a determination that the user equipment has not changed cells since the most recent search was performed, determining whether the time period since the most recent search is greater than a threshold value.

17. The method as set forth in claim 16, further comprising, in response to a determination that the time period since the most recent search is greater than the threshold value, performing a new search.

18. The method as set forth in claim 10, wherein the most recent search searched for higher priority cells operating on a first carrier frequency.

* * * * *